United States Patent [19]

Yamamoto et al.

[11] Patent Number: 4,916,529
[45] Date of Patent: Apr. 10, 1990

[54] IMAGING DEVICE UTILIZING SOLID-STATE IMAGE SENSORS COMBINED WITH A BEAM-SPLITTING PRISM

[75] Inventors: Haruhisa Yamamoto, Fujisawa; Ryuji Ohmuro, Yokohama, both of Japan

[73] Assignee: Canon Kabushiki Kaisha, Tokyo, Japan

[21] Appl. No.: 119,093

[22] Filed: Nov. 10, 1987

[30] Foreign Application Priority Data

Nov. 14, 1986 [JP] Japan ............... 61-174816[U]
Nov. 17, 1986 [JP] Japan ............... 61-176533[U]

[51] Int. Cl.$^4$ ............................................. H04N 9/09
[52] U.S. Cl. ......................................... 358/50; 358/55; 350/173
[58] Field of Search .............. 358/50, 55; 350/169, 350/173, 286, 287; 228/121, 122, 123, 124

[56] References Cited

U.S. PATENT DOCUMENTS

| | | | |
|---|---|---|---|
| 3,103,067 | 9/1963 | Dixon ........................... | 228/124 M |
| 3,518,753 | 7/1970 | Heidenreich .................. | 228/123 X |
| 3,949,118 | 4/1976 | Nagano et al. ................ | 228/121 X |
| 4,072,405 | 2/1978 | Ozeki ........................... | 358/55 X |
| 4,084,180 | 4/1978 | Stoffels et al. ................ | 358/55 |
| 4,172,547 | 10/1979 | Del Grande ................... | 228/124 X |
| 4,237,480 | 12/1980 | Franken et al. ............... | 358/55 |
| 4,268,119 | 5/1981 | Hartmann ..................... | 350/173 |
| 4,323,918 | 4/1982 | Bendell ......................... | 358/50 |
| 4,591,901 | 5/1986 | Andrevski ..................... | 358/50 |
| 4,623,916 | 11/1986 | Levine .......................... | 358/50 |
| 4,659,378 | 4/1987 | Volz et al. .................... | 228/122 X |
| 4,789,891 | 12/1988 | Kanayama et al. ............ | 358/55 |

FOREIGN PATENT DOCUMENTS

| | | |
|---|---|---|
| 54-111419 | 8/1979 | Japan . |
| 58-63279 | 4/1983 | Japan . |
| 59-39580 | 3/1984 | Japan . |
| 61-135279 | 6/1986 | Japan . |

OTHER PUBLICATIONS

Science News Letter, Apr. 14, 1951, vol. 59, "Glass Soldered to Metal In New Bonding Process", p. 231.

*Primary Examiner*—Howard W. Britton
*Assistant Examiner*—Mark R. Powell
*Attorney, Agent, or Firm*—Fitzpatrick, Cella, Harper & Scinto

[57] ABSTRACT

An imaging device having solid-state image sensors coupled to a prism for separating the light from an objective optical system, wherein a solder layer capable of adhering to a glass substance is formed on a part of said prism or on a glass plate adhered to said prism, and a gap between said solder layer and a solderable material formed on a casing of said solid-state image sensor is filled with a low-melting metal to unite the two. The metal layer thickness of the solder layer is disposed to cause the light receiving surface of the image sensor to correspond to a predetermined imaging plane of the imaging device.

27 Claims, 7 Drawing Sheets

IMAGING DEVICE UTILIZING SOLID-STATE IMAGE SENSORS COMBINED WITH A BEAM-SPLITTING PRISM

BACKGROUND OF THE INVENTION

1. Field of the Invention

The present invention relates to an imaging device such as a color television camera, and more particularly to a device having a structure in which a color-separation prism is combined with solid-state image sensors for respectively receiving component images obtained by said color-separation prism.

2. Related Background Art

The relative positional relationship between a light emitting face in each color channel of the color-separation prism and a light receiving face of the solid state image sensor has to be determined in consideration of the focus light axial adjustment in each color channel, the inclination adjustment of the light receiving face for avoiding image blur at a side of the image field, and the registration adjustment (parallel and rotational displacements in a plane perpendicular to the optical axis) among different color channels. If such adjustments are rendered possible by mounting each solid-state image sensor through an adjustable support mechanism on a substrate or a housing member supporting the color-separation prism, the imaging device itself is inevitably associated with complex support mechanisms. Also there is known, as disclosed in Japanese utility model laid-open No. 111419/1979, a method of adhering each solid-state image sensor directly on the light emitting face of each color channel of the color-separation prism by means of a transparent adhesive material, Though this method enables translational and rotational adjustments in a plane perpendicular to the optical axis, the axial adjustments for focusing and avoiding image blur at one side are not possible.

For enabling the adjustments in the axial direction, Japanese patent laid-open No. 63279/1983 discloses a method of placing a flexible spacer between the rim portions of the light emitting face of the color-separation prism and the light receiving face of the solid-state image sensor and maintaining said spacer in a flexibly deformed state by hardening an adhesive material applied on lateral portions of said spacer. However, if the adhesive material has a large thermal expansion coefficient, the defocusing caused by a temperature change becomes large and not negligible for solid-state image sensors of a high resolving power. Also in this method, the presence of thick adhesive material may cause an error in focus or registration after a prolonged time. It is also proposed to mount the solid-state image sensor with a metal mounting member adhered on the color-separation prism. However, a rapid temperature change may cause damage in the color-separation prism if the thermal expansion coefficient thereof is significantly different from that of the metal mounting member. Also it is hard to remove the dust if deposited in the corner portion of the mutually adhered prism surface and mounting member.

On the other hand, in case of a malfunction in one of the solid-state image sensors, such a defective image sensor has to be peeled off from the color-separation prism for replacement, and such a peeling operation often causes damage on the surface of the prism.

The Japanese utility model laid-open No. 39580/1984 proposes to provide supporting pillars on the light emitting face of the color-separation prism and to connect said pillars with a mounting member for the solid-state image sensor by means of soldering in the same manner as in the connection of electric parts. Although such connection by soldering is convenient for detaching the solid-state image sensor, no disclosure is made as to the fixing method for the pillars.

The Japanese patent laid-open No. 135279/1986 proposes to adhere a support member with an aperture onto the light emitting face of the color-separation prism and to connect, by soldering, plural legs of said support member with the legs of a mounting member supporting the solid-state image sensor. However fine dust particles, eventually deposited in a portion where the rim of the aperture of the support member is in contact with the prism face during the assembling operation, are difficult to remove, and the image quality may deteriorate by the light scattered by remaining dust particles. Furthermore the adhesion of a metal member may result in the drawbacks mentioned above.

SUMMARY OF THE INVENTION

A first object of the present invention is to enable, in combining solid-state image sensors with a color-separation optical system, adjustments not only in the horizontal, vertical and rotational directions but also in the axial direction and in inclination.

A second object of the present invention is to enable rapid assembly of the solid-state image sensor with stability over a prolonged time, and to enable easy detachment thereof.

A third object of the present invention is to provide a structure capable of minimizing dust deposition in the vicinity of the image-taking light path.

DETAILED DESCRIPTION OF THE PREFERRED EMBODIMENTS

Figure 1:
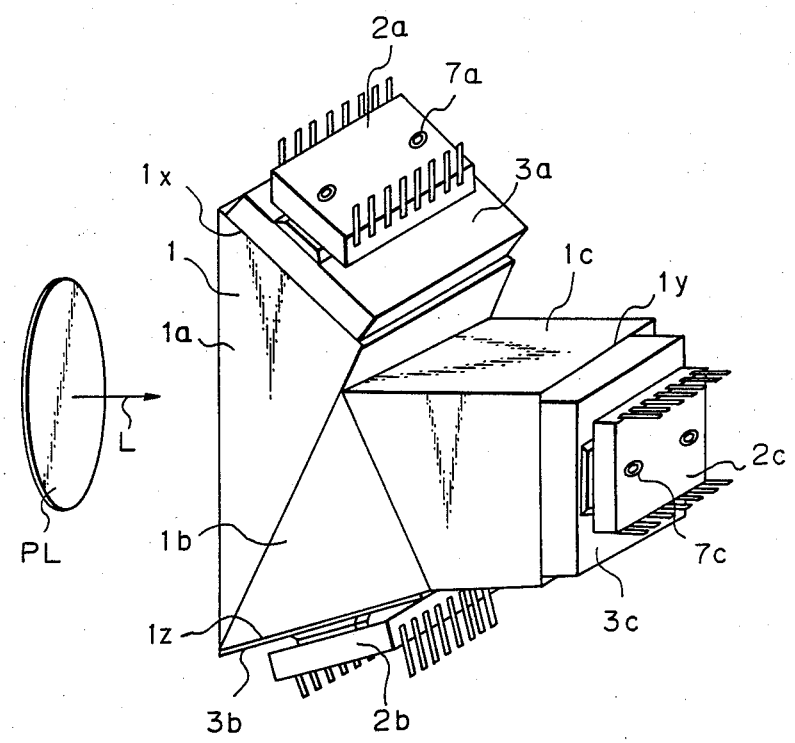
FIG. 1 is a perspective view of an embodiment of the present invention.
Figure 2:
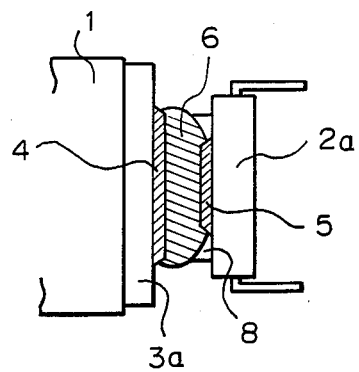
FIG. 2 is an enlarged view of an essential part thereof.

Now reference is made to FIGS. 1 and 2 for explaining a first embodiment of the present invention.

In FIG. 1 a color-separation prism 1 is composed of a combination of component prism 1a, 1b, 1c, with dichroic layers therebetween, and with light emitting faces 1x, 1y, 1z. The structure of such color-separation prism is already known and will not be explained in detail. An image-taking light beam L comes from a schematically illustrated lens PL. Color trimming filters 3a, 3b, 3c of red, blue and green are adhered to light emitting faces 1x, 1y, 1z. In the present embodiment the solid-state image sensors are coupled on the color trimming filters 3a, 3b, 3c, but they may also be directly coupled with the light emitting faces. Solid-state image sensors 2a, 2b, 2c have two-dimensional sensor arrays respectively accommodated in a casing, and are provided with screw holes 7a, 7c for engaging with screws of an unrepresented jig of a manipulator at the assembling of the device.

FIG. 2 is an enlarged view of the adhered portion, showing only the solid-state image sensor 2a for simplicity. On the color trimming filter 3a there are formed islands of glass solder 4, 4, by fusion with an exclusive tool, to define bonding areas. Said solder islands may be mutually connected in a square U-shape.

The glass solder employed for adhesion by fusion to the glass is a product of Asahi Glass Co., Ltd. known under a trade name of Cerasolzer, and the adhesion is achieved by an exclusive tool providing head and cavitation effects by ultrasonic vibration. The glass solder is composed of a Pb-Sn alloy, known for the usual electric solder, further containing a small amount of Zn, Sb, Ti, Si, Al or Cu, and can be directly adhered to glass, ceramics etc. Such glass solder is already disclosed in the Japanese patent publication No. 20098/1968 and an article "Soldering technology for direction adhesion of metal to glass or ceramics", in Nikkei Electronics, Oct. 18, 1976.

Figure 3:
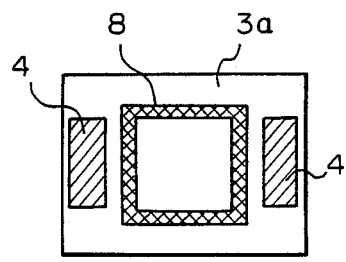
FIGS. 3 and 4 are plan views thereof.
Figure 4:
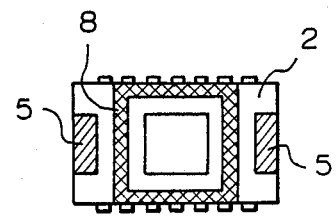

As shown in FIG. 3, the glass solder layers 4, 4 are provided on both sides of the area of the imaging light beam. Also as shown in FIG. 4, glass solder layers 5, 5 are formed on the rim portion of the ceramic casing of the solid-state image sensor 2a. A dust-preventing frame 8, composed of rubber sponge is positioned between the trimming filter 3a and the solid-state image sensor in order to prevent dust intrusion into the imaging optical path.

As shown in FIG. 2, a low-fusing metal 6 such as ordinary solder is adhered by fusion to the glass solder layers 4 of the color-separation prism and those 5 of the solid-state image sensor, thereby connecting the two. The connection with ordinary solder is achieved in the following manner.

At first a test pattern is viewed through the photographing lens PL to form images of said test pattern at a predetermined distance from the light emitting faces 1x, 1y, 1z of the color-separation prism 1. On the other hand the solid-state image sensor 2a is mounted on an unrepresented jig, and said jig is so adjusted that the light receiving face of said image sensor 2a coincides with said image of the test pattern. In this operation, the video signal from the solid-state image sensor is supplied to a television unit, and there are conducted adjustment in the axial direction, translational and rotational adjustments in a plane perpendicular to the optical axis, and adjustment in face inclination so as to obtain a good displayed test pattern.

Then the gap between the glass solder layer 4 on the color trimming filter 3a and the glass solder layer 5 of the solid-state image sensor 2a is filled with ordinary solder 6 by means of a heating tool such as a soldering iron, thereby connecting the solid-state image sensor 2a to the color-separation prism 1. Other solid-state image sensors can also be similarly connected to the color-separation prism.

Figure 5:
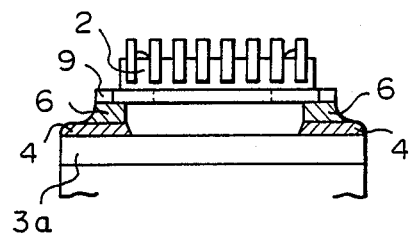
FIG. 5 is a longitudinal lateral view of a second embodiment.
Figure 6:
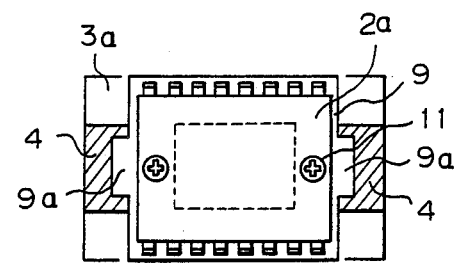
FIG. 6 is a plan view thereof.
Figure 7:
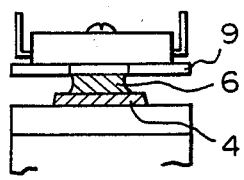
FIG. 7 is a transversal lateral view thereof.

FIGS. 5, 6 and 7 illustrate another embodiment, wherein FIG. 6 is a plan view of the structure shown in FIG. 5, and FIG. 7 is a lateral view thereof. In this embodiment the glass solder layers 4 of the color-separation prism are similar to those in the foregoing embodiment, but the solid-state image sensor 2a is mounted, for example with screws, on a metal frame 9 accepting ordinary solder, and ears 9a of said metal frame 9 are used for adhesion. The metal frame 9 is provided with a central aperture for transmitting the imaging light beam.

Also in the present embodiment, the solid-state image sensor 2a and the mounting frame 9 in the assembled state are supported by a positioning tool, and the image sensor 2a is positioned by means of the image of the test pattern. Subsequently the glass solder layers 4 of the trimming filter 3 and the ears 9a of the mounting frame 9 are connected with ordinary solder.

Figure 8:
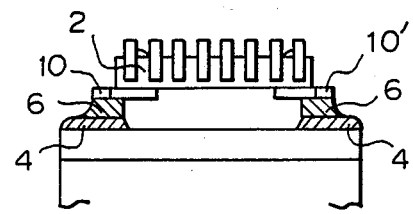
FIG. 8 is a longitudinal lateral view of a third embodiment.
Figure 9:
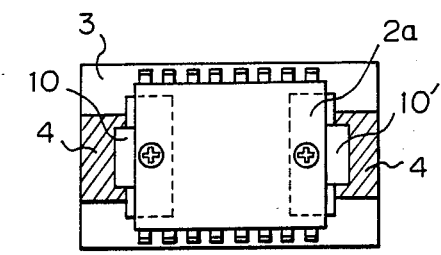
FIG. 9 is a plan view thereof.
Figure 10:
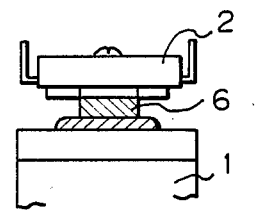
FIG. 10 is a transversal lateral view thereof.

FIGS. 8, 9 and 10 illustrate a variation of the embodiment shown in FIG. 5, wherein the mounting frame 9 is replaced by two mounting metal members 10, 10' which are screwed onto the solid-state image sensor 2a and are soldered to the glass solder layers 4 of the color-separation prism after the positioning operation. These embodiments facilitate the replacement of the solid-state image sensor as it is mechanically mounted on the mounting frame or members.

It is also possible to form adhering portions of the solid-state image sensor by a metallization process, and to connect said portions with the glass solder layers of the color-separation prism with ordinary solder. It is furthermore possible to directly connect the adhering portions formed on the casing of the solid-state image sensor and the glass surface of the color-separation prism with glass solder by means of the above-explained exclusive tool, although the productivity is somewhat inferior. Also the adhering portions may be formed on the trimming filter by metallization.

Figure 11:
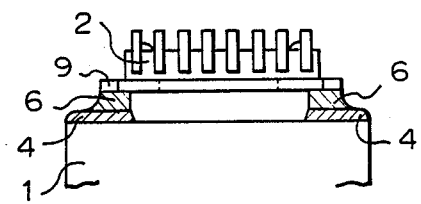
FIG. 11 is a longitudinal lateral view of a fourth embodiment.
Figure 12:
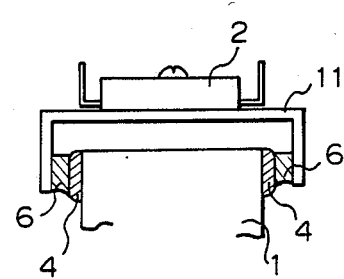
FIG. 12 is a transversal lateral view of a fifth embodiment.

In the embodiment shown in FIG. 1, the glass solder layers are formed on the trimming filter, but, as shown in FIG. 11, the glass solder layers 4 for connection with the solid-state image sensor may be directly formed on the color-separation prism. FIG. 12 illustrates a variation in which glass solder layers 4 are formed on lateral walls of the color-separation prism and are bonded, with ordinary solder, to the legs of a mounting frame 11.

Figure 13:
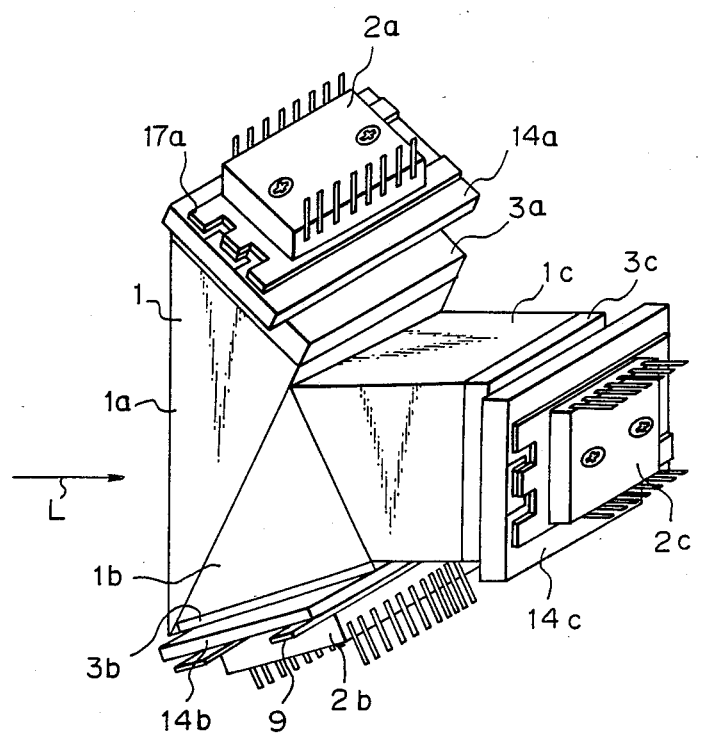
FIG. 13 is a perspective view of a sixth embodiment.

FIG. 13 illustrates an embodiment with a smaller color-separation prism and with improved optical performance, wherein the same components as those in FIG. 1 are represented by the same number. Mounting glass plates 14a, 14b, 14c have a same or similar thermal expansion coefficient as that of the color-separation prism 1 or the trimming filters. In the present embodiment the mounting glass plates are adhered on the trimming filters, but said filters themselves may also be used for this purpose. Also if the trimming filters are replaced by multi-layered interference films formed by vacuum evaporation on the light emitting faces of the prism, the mounting glass plates may be adhered directly on said light emitting faces. The mounting glass plates 14a, 14b, 14c in the present embodiment have such a dimension as to protrude from the wall faces of the color-separation prism for the following reason.

Figure 14:
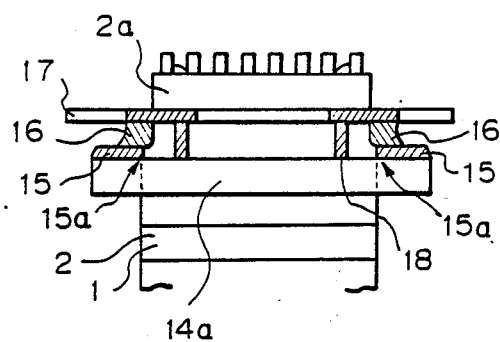
FIG. 14 is a cross-sectional view of an essential part thereof.
Figure 15:
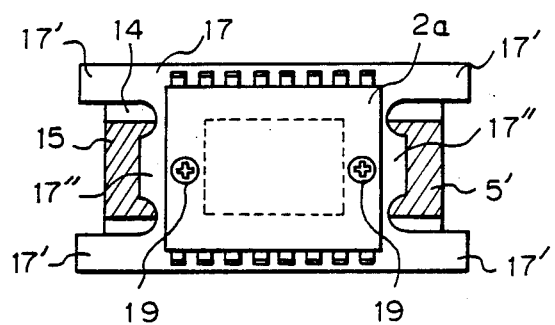
FIG. 15 is a plan view thereof.

FIG. 14 shows the details of the bonding portions, while FIG. 15 is a plan view. Adhering areas 15, 15' of glass solder are formed on the mounting glass plate 14a, and have glass solder adhered by fusion with the aforementioned exclusive tool. Said glass solder layers are preferably so formed that the rims 15, 15' do not exceed the extension of the lateral walls of the color-separation prism 1, or at least most of the adhering portion is formed in such manner.

The above-mentioned structure is adopted because the interface between the glass solder layer and the underlying mounting glass plate is reflective so that the light around the effective imaging light may be reflected by said interface and then by other places to induce flare or ghost phenomenon if such light enters said interface. It will be understood that a color-separation prism large enough for forming a marginal space around the imaging light path will result in significant wastes in cost and space.

A mounting frame 17 is composed of a metal accepting ordinary solder, and is provided with an aperture for transmitting the imaging light beam and protruding four legs 17' as shown in FIG. 15. Said legs facilitate supporting with a tool at the assembly. The solid-state image sensor 2a is fixed, with screws 19, on the mounting frame 17. Said frame 17 is further provided with two ears 17'' which are connected to the above-mentioned glass solder layers 15, 15' with ordinary solder 16, 16' filling the gap between the two.

A dust preventing frame 18, composed of a compressible material such as rubber sponge and provided with an aperture for transmitting the imaging light beam, is sandwiched between the mounting frame 17 and the mounting glass plate 14.

The bonding operation with ordinary solder 16 is conducted as follows. At first a test pattern is viewed through the photographing lens to form the images of the test pattern at a predetermined distance from the light emitting faces of the color-separation prism 1. On the other hand, the legs 17' of the mounting frame are supported by an unrepresented adjusting tool, and said tool is so adjusted that the light receiving face of the solid-state image sensor coincides with said images of the test pattern. In this operation the video signal from the solid-state image sensor is supplied to a television unit and there are conducted axial adjustment, translational and rotational adjustments in a plane perpendicular to the optical axis, and adjustment in the plane inclination so as to obtain a satisfactory displayed test pattern.

Subsequently the gap between the glass solder layers 15, 15' on the mounting glass plate 14a and the ears 17, 17'' of the mounting frame for the solid-state image sensor 2a is filled with ordinary solder 6 by means of a heating tool such as a soldering iron, whereby the solid-state image sensor is mounted on the color-separation prism 1.

Figure 16:
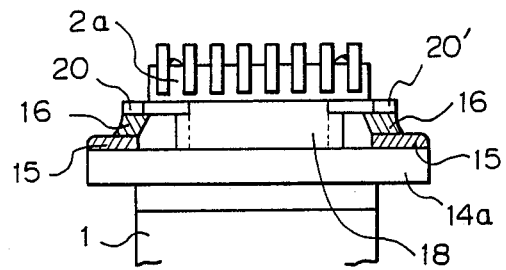
FIG. 16 is a lateral view of an essential portion of a seventh embodiment.
Figure 17:
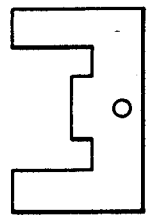
FIG. 17 is a plan view of a component part.
Figure 18:
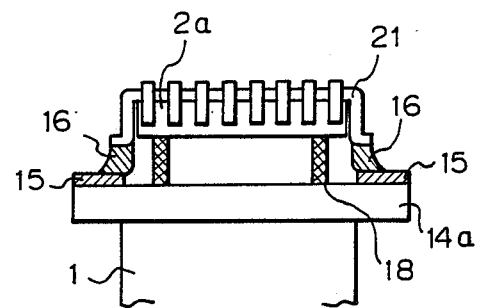
FIG. 18 is a longitudinal lateral view of an eighth embodiment.

FIG. 16 shows another embodiment in which the mounting frame 17 in the foregoing embodiment is replaced by two mounting members 10, 10', similar to those shown in FIG. 7, which are to be screwed onto the solid-state image sensor 2a. Also FIG. 18 illustrates an embodiment in which the solid-state image sensor 2a is fixed, at the back side thereof, to a mounting member 21.

These embodiments facilitate the replacement of the solid-state image sensor as it can be mechanically fixed on a mounting frame.

On the other hand, instead of employing the mounting frame, it is also possible to employ a larger casing for the solid-state image sensor, to form the above-mentioned glass solder layers on both ends of said casing and to bond said glass solder layers with the glass solder layers on the mounting glass plate by means of ordinary solder. Furthermore, said glass solder layers, formed on the light-emitting face of the prism, may also be provided on other faces thereof.

The present invention is applicable not only in a color television camera but also in an apparatus for converting the image of a color film into a video signal. In the latter case, the solid-state image sensor only requires a one-dimensional sensor array. Furthermore the present invention is applicable to a case where the image sensor is mounted on other beam splitters than the color-separation prism or remains unfixed.

The present invention is characterized by a short hardening time due to the use of ordinary electrical solder for bonding in the above-explained structure, hardly generates errors in the assembly due to the absence of other forces during the bonding operation, and minimizes the loss in strength over a prolonged period, thereby avoiding positional changes by external mechanical forces or by changes in the ambient conditions. The firm bonding on the color-separation prism prevents undesirable influences on the image quality. Also exact adjustments on focus, registration and inclination contribute to the improvement in image quality.

What is claimed is:

1. A device for generating electrical signals in response to the light from an optical system, comprising:
   a prism assembly having plural light emitting faces, for separating the light from said optical system into plural component lights;
   solid-state image sensors for respective photo-electric conversions of said component lights, provided respectively with adhering areas composed of a material allowing adhesion by fusion of a low-melting metal;
   bonding areas formed on one of said prism assembly and optical components of a glass substance adhered thereto with a solder material capable of adhesion by fusion to a glass substance, and adapted to be respectively bonded to said solid-state image sensors; and
   low-melting metal layers each having a metal layer thickness disposed to cause a light receiving surface of a respective solid-state image sensor to correspond to a predetermined imaging plane of the optical system, said low-melting metal layers being disposed between said adhering areas and said bonding areas.

2. A device according to claim 1, wherein said optical components of a glass substance comprise color trimming filters.

3. A device according to claim 1, wherein said optical components of a glass substance comprise color trimming filters and glass plates for mounting said solid-state image sensors.

4. A device according to claim 1, wherein said optical components of a glass substance comprise glass plates for mounting said solid-state image sensors.

5. A device according to claim 4, wherein said glass plates are dimensioned as to protrude from mutually parallel lateral walls said prism assembly.

6. A device according to claim 4, wherein each of said bonding areas comprises two sub-areas formed on each of said glass plates.

7. A device according to claim 6, wherein said glass plates are dimensioned to protrude from mutually parallel walls of said prism assembly, and wherein said sub-areas are substantially formed on said protruding portions.

8. A device according to claim 1, wherein each of said bonding areas comprises two sub-areas formed on each of said light emitting faces.

9. A device according to claim 1, wherein said adhering areas comprise solder layers capable of adhesion by fusion to a glass substance, formed on casings of said solid-state image sensors.

10. A device according to claim 1, wherein said adhering areas comprise metal members connected to casings of said solid-state image sensors.

11. A device according to claim 10, wherein each of said metal members is provided with an aperture therein.

12. A device according to claim 11, wherein each of said metal members comprises two separate pieces.

13. A device according to claim 1, wherein said adhering areas comprise metal films formed on casings of said solid-state image sensors.

14. A device according to claim 1, wherein said low-melting metal layers comprise solder.

15. A device according to claim 1, wherein each of said optical components of glass substance is adhered to one of the light emitting faces of said prism assembly and comprises an optical filter and a glass plate; and wherein each of said bonding areas comprises two sub-areas formed on said glass plate and bonded to one of said adhering areas with solder.

16. A device according to claim 15, wherein said glass plates are dimensioned as to protrude from mutually parallel lateral walls of said prism assembly.

17. A device according to claim 16, wherein said sub-areas are formed on portions of said glass plate protruding from said lateral walls.

18. A device according to claim 1, wherein each of said optical components of glass substance is adhered to one of the light emitting faces of said prism assembly and wherein comprises a glass plate; and each of said bonding areas comprises two sub-areas formed on said glass plate and bonded to one of said adhering areas with solder.

19. A device according to claim 18, wherein said glass plates are dimensioned as to protrude from mutually parallel lateral walls of said prism assembly.

20. A device according to claim 19, wherein said sub-areas are formed on portions of said glass plate protruding from said lateral walls.

21. A device for generating electrical signals in response to the light from an optical system, comprising:
a prism assembly having plural light emitting faces, for separating the light from said optical system into plural component lights;
solid-state image sensors for respective photo-electric conversions of said component lights, provided respectively with adhering areas composed of a material allowing adhesion by fusion of a low-melting metal;
glass plates respectively supported by said light emitting faces;
plural island-shaped solder layers capable of adhesion by fusion to a glass substance, formed on each of said glass plates; and
low-melting metal layers each having a metal layer thickness disposed to cause a light receiving surface of a respective solid-state image sensor to correspond to a predetermined imaging plane of the optical system, said low-melting metal layers being disposed between said solder layers and said adhering portions.

22. A device according to claim 21, wherein said low-melting metal is ordinary solder.

23. A device according to claim 21, wherein said glass plates are dimensioned as to protrude from lateral walls of said prism assembly.

24. A device according to claim 23, wherein the protruding portions of each of said glass plates are provided with said solder layers.

25. A device according to claim 21, wherein said glass plates are optical filters.

26. A device according to claim 21, further comprising optical filters respectively adhered to said light emitting faces and said glass plates.

27. A device for generating electrical signals in response to the light from an optical system, comprising:
a prism assembly having plural light emitting faces, for separating the light from said optical system into plural component lights;
solid-state image sensors for respective photo-electric conversions of said component lights, provided respectively with adhering areas composed of a material allowing adhesion by fusion of a low-melting metal;
bonding areas formed on one of said prism assembly and optical components of a glass substance adhered thereto with a metalized material capable of adhesion by fusion to a glass substance, and adapted to be respectively bonded to said solid-state image sensors; and
a low-melting metal layer the thickness of which is arranged to cause a light receiving surface of one of said solid-state image sensors to correspond with a predetermined imaging plane of said optical system, said low-melting metal layer being disposed between said bonding areas and said adhering areas.

* * * * *

UNITED STATES PATENT AND TRADEMARK OFFICE
CERTIFICATE OF CORRECTION

PATENT NO.   :   4,916,529
DATED        :   April 10, 1990
INVENTOR(S)  :   Yamamoto, et al.

It is certified that error appears in the above-identified patent and that said Letters Patent is hereby corrected as shown below:

COLUMN 1:

Line 34, "material," should read --material.--.

COLUMN 3:

Line 15, "with" should read --the--. (2nd occurrence)

COLUMN 7:

Line 3, "walls said" should read --walls of said--.

Line 50, "wherein" should be deleted, and "and each" should read --and wherein each--.

Signed and Sealed this

Twenty-fourth Day of September, 1991

Attest:

HARRY F. MANBECK, JR.

Attesting Officer  Commissioner of Patents and Trademarks